United States Patent
Guo et al.

(10) Patent No.: US 8,848,778 B2
(45) Date of Patent: Sep. 30, 2014

(54) COVARIANCE ESTIMATION METHOD FOR SPACE-FREQUENCY DOMAIN EQUALIZATION AND APPARATUS AND SYSTEM ASSOCIATED THEREWITH

(75) Inventors: Zhiheng Guo, Beijing (CN); Hai Wang, Beijing (CN); Ruiqi Zhang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/990,455

(22) PCT Filed: Dec. 8, 2010

(86) PCT No.: PCT/CN2010/001989
§ 371 (c)(1),
(2), (4) Date: May 30, 2013

(87) PCT Pub. No.: WO2012/075604
PCT Pub. Date: Jun. 14, 2012

(65) Prior Publication Data
US 2013/0243069 A1   Sep. 19, 2013

(51) Int. Cl.
*H03H 7/30* (2006.01)
*H04L 25/03* (2006.01)
*H04L 25/02* (2006.01)
*H04B 7/08* (2006.01)

(52) U.S. Cl.
CPC .... *H04L 25/03891* (2013.01); *H04L 25/03968* (2013.01); *H04L 25/0228* (2013.01); *H04B 7/0848* (2013.01)
USPC ........... 375/232; 375/233; 375/260; 375/262; 375/265; 375/267; 375/340; 375/343; 375/346; 375/350

(58) Field of Classification Search
CPC . H04L 25/03343; H04L 1/04; H04L 25/0202; H04L 25/0204; H04L 25/0212; H04L 25/022; H04L 25/0222; H04L 25/0236; H04L 27/2614; H04L 27/2626; H04L 27/2634; H04L 5/0023
USPC ......... 375/232, 233, 260, 262, 265, 267, 340, 375/343; 370/203, 204, 205, 208, 209, 210
See application file for complete search history.

(56) References Cited

U.S. PATENT DOCUMENTS

| 7,822,156 | B2* | 10/2010 | Aytur et al. | 375/350 |
| 8,027,395 | B2* | 9/2011 | Akella et al. | 375/260 |
| 8,275,057 | B2* | 9/2012 | Hewavithana et al. | 375/260 |
| 2008/0089395 | A1 | 4/2008 | Cairns | |
| 2009/0304132 | A1 | 12/2009 | Cairns et al. | |

FOREIGN PATENT DOCUMENTS

| WO | 2007147943 A1 | 12/2007 |
| WO | 2008104643 A1 | 9/2008 |

OTHER PUBLICATIONS

Cairns, D. et al. "Robust and Efficient Parametric Linear Equalization." Certified by IEEE PDF eXpress, Jan. 22, 2009, pp. 1-5.
Cheng, T. et al. "Algorithms and Realistic Performance of S3G Multi-Antenna Uplink." Ericsson Invention Disclosure, May 30, 2006, pp. 1-28.
Hui, D. et al. "Comparison of OFDM and SC-FDMA for Super 3G Uplink—Part II: Performance with Realistic Channel Estimations." Ericsson Invention Disclosure, Oct. 17, 2005, pp. 1-86.
He, N. "Channel and impairment estimations for Uplink—Summary of Performance Impacts and Suggestions for Improvement." Ericsson Invention Disclosure, Aug. 17, 2010, pp. 1-9.

* cited by examiner

*Primary Examiner* — Dhaval Patel
(74) *Attorney, Agent, or Firm* — Murphy, Bilak & Homiller, PLLC

(57) ABSTRACT

The present invention relates to a method for generating impairment covariances for equalization in a receiver of a wireless communication system, as well as an covariance estimator, a receiver and a wireless communication system associated therewith, where the receiver is equipped with multiple antennas, and an impairment covariance matrix is used to calculate equalization weighting vector for signals transmitted by a transmitter, the method comprising the steps of: calculating a raw impairment covariance estimate between a first antenna and a second antenna of the multiple antennas on each of subcarriers allocated to the transmitter in frequency domain, transforming the raw impairment covariance estimates into time domain, masking the transformed impairment covariance estimates by a triangle window with a width defined by a maximum delay spread, determining a threshold based on the transformed impairment covariance estimates for the subcarriers and thresholding the masked impairment covariance estimates with the determined threshold, and transforming the thresholded impairment covariance estimates into frequency domain to form an impairment covariance matrix for calculating the equalization weighting vector. The impairment covariance estimation according to the present invention provides a performance improvement in equalization.

18 Claims, 3 Drawing Sheets

US 8,848,778 B2

COVARIANCE ESTIMATION METHOD FOR SPACE-FREQUENCY DOMAIN EQUALIZATION AND APPARATUS AND SYSTEM ASSOCIATED THEREWITH

TECHNICAL FIELD

The present invention relates generally to the field of wireless communication, and particularly to a covariance estimation method for space-frequency domain equalization, as well as apparatus and system associated therewith.

BACKGROUND

Broadband wireless access technologies, offering bit rates of megabits per second or more to residential and business subscribers, are attractive and economical alternatives to broadband wired access technologies. Several variations of OFDM (Orthogonal Frequency-Division Multiplexing) have been proposed as effective anti-multipath wireless channel techniques, this is mainly because of the favorable trade-off they offer between performance in severe multipath situation and signal processing complexity. In 3GPP (the Third Generation Partnership Project) standard, LTE (Long Term Evolution) SC-FDMA (Single Carrier Frequency Division Multiple Access) and OFDM are accepted as the uplink and downlink access technologies respectively. Frequency domain equalization is a necessary receiving technique in SC-FDMA to combat the interference caused by multi-path propagation. In multi-antenna cases, linear MMSE (Minimum Mean Square Error) antenna combining is designed in frequency domain and followed by a frequency domain equalizer in a receiver. Such a receiver is often called an IRC (Interference-Rejection-Combining) receiver.

In order to perform linear MMSE antenna combining, impairment covariance is estimated on each sub-carrier in addition to the channel estimation. The impairment covariance estimation algorithms can be summarized as non-parametric (or non-structured) and parametric (structured). The non-parametric approach is used in IRC.

The basic impairment covariance estimate can be based on channel estimations for a number of sub-carriers, typically in one resource block. In conventional impairment covariance estimation methods, multiple basic impairment covariance estimates are generally averaged in order to reduce impact of noise. Simulations show that the non-parametric covariance estimation works well if impairment covariance estimates are averaged over a small bandwidth, e.g. one or two resource blocks, in interference limited scenarios. However the performance gap with an ideal IRC becomes too large when the number of involved receiving antennas increases, for example in case of eight-antenna.

SUMMARY

An object of the present invention is to provide an improved method, for impairment covariance estimation as well apparatus and system associated therewith, which obviate at least the above-mentioned disadvantages.

According to a first aspect of embodiments of the present invention, the present invention provides a method of generating impairment covariance estimates for equalization in a receiver of a wireless communication system, wherein the receiver is equipped with multiple antennas, and an impairment covariance matrix is used to calculate equalization weighting vector for signals transmitted by a transmitter. The method comprises the steps of: calculating a raw impairment covariance estimate between a first antenna and a second antenna of the multiple antennas on each of subcarriers allocated to the transmitter in frequency domain, transforming the raw impairment covariance estimates into time domain, masking the transformed impairment covariance estimates by a triangle window with a width defined by a maximum delay spread, determining a threshold based on the transformed impairment covariance estimates and thresholding the masked impairment covariance estimates with the determined threshold, and transforming the thresholded impairment covariance estimates into frequency domain to form the impairment covariance matrix.

According to a second aspect of embodiments of the present invention, the threshold is determined based on a maximum absolute value of the transformed impairment covariance estimates in an interval determined by the maximum delay spread.

According to a third aspect of embodiments of the present invention, the threshold $\rho_{T\,a,b}$ is set as follows:

$$\rho_{T\,a,b} = (1+\epsilon) \cdot \max(|\rho_{a,b}(n)|), n = \lceil \tau_P \rceil + 1, \ldots, M - (\lceil \tau_P \rceil + 1), \text{ and}$$

$$\text{pwr}_{a,b} = \text{var}(\rho_{a,b}(n)), n = \lceil \tau_P \rceil + 1, \ldots, M - (\lceil \tau_P \rceil + 1),$$

if $$\frac{\max_{a=1,\ldots,A} |\rho_{a,a}(0)|^2}{\frac{1}{A}\sum_{a=1}^{A} \text{pwr}_{a,a}} > 1.1 \cdot M,$$

then the threshold $\rho_{T\,a,b}$ is set as zero, wherein $\tau_p$ is the maximum delay spread of the channel between the transmitter and the receiver, $\rho_{a,b}(n)$ are the transformed impairment covariance estimates between the first antenna a and the second antenna b, M is the number of subcarriers and A is the number of antennas.

According to a fourth aspect of embodiments of the present invention, the thresholding is performed as follows to generate the thresholded impairment covariance estimate $\hat{\hat{\rho}}_{a,b}(n)$:

$$\hat{\hat{\rho}}_{a,b}(n) = \hat{\rho}_{a,b}(n) \cdot \frac{\text{sign}(|\hat{\rho}_{a,b}(n)| - \rho_{T_{a,b}}) + 1}{2}, n = 0, \ldots, M-1,$$

wherein $\hat{\rho}_{a,b}(n)$ are the masked impairment covariance estimates between the first antenna a and the second antenna b, and $\rho_{T\,a,b}$ is the determined threshold.

According to a fifth aspect of embodiments of the present invention, transforming into time domain is performed by Discrete Fourier Transformation, and the triangle window is defined by a power of a triangle function.

According to a sixth aspect of embodiments of the present invention, masking is performed as follows to generate the masked impairment covariance $\hat{\rho}_{a,b}(n)$:

$$\hat{\rho}_{a,b}(n) = \begin{cases} \left(\frac{-n}{\lceil \tau_P \rceil} + 1\right)^q \cdot \rho_{a,b}(n), & n = 0, \ldots, \lceil \tau_P \rceil \\ 0, & n = \lceil \tau_P \rceil + 1, \ldots, M - (\lceil \tau_P \rceil + 1) \\ \left(\frac{n-M}{\lceil \tau_P \rceil} + 1\right)^q \cdot \rho_{a,b}(n), & n = M - \lceil \tau_P \rceil, \ldots, M-1, \end{cases}$$

wherein $\rho_{a,b}(n)$ are the transformed impairment covariance estimates between the first antenna a and the second antenna b, $\tau_P$ is the maximum delay spread of the channel between the transmitter and the receiver, and M is the number of subcarriers.

Preferably, the wireless communication system is a Long Term Evolution system and the receiver is an Interference-Rejection-Combing IRC receiver. More preferably, the wireless communication system is a Time Division-Long Term Evolution system and the number of antennas is eight.

According to a seventh aspect of embodiments of the present invention, the present invention provides an covariance estimator for generating impairment covariances for equalization in a receiver of a wireless communication system, wherein the receiver is equipped with multiple antennas, and an impairment covariance matrix is used to calculate an equalization weighting vector for signals transmitted by a transmitter. The covariance estimator comprises a covariance calculating unit for calculating a raw impairment covariance estimate between a first antenna and a second antenna of the multiple antennas on each of subcarriers allocated to the transmitter in frequency domain, a first transformer unit for transforming the raw impairment covariance estimates into time domain, a masking unit for masking the transformed impairment covariance estimates by a triangle window with a width defined by a maximum delay spread, a thresholding unit for determining a threshold based on the transformed impairment covariance estimates and thresholding the masked impairment covariance estimates with the determined threshold, and a second transformer unit for transforming the thresholded impairment covariance estimates into frequency domain to form the impairment covariance matrix.

According to a eighth aspect of embodiments of the present invention, the present invention provides a receiver comprising said covariance estimator.

According to a ninth aspect of embodiments of the present invention, the present invention provides a wireless communication system comprising said receiver.

The present invention further provides a computer program product enabling a programmable device to perform the method according to the invention.

According to the present invention, the raw impairment covariance estimate is transformed into time domain and masked by the power of a triangle function for filtering followed by thresholding, and then it is transformed back to the frequency domain. This will substantially reduce noises. An advantage of embodiments of the invention is that the proposed impairment covariance estimation has a remarkable performance improvement when comparing to the state-of-art impairment covariance estimation, especially in case of a large number of antennas, for example, an eight-antenna IRC case.

BRIEF DESCRIPTION OF THE DRAWINGS

The foregoing and other objects, features, and advantages of embodiments of the present invention will become more apparent from the following description of preferred embodiments and accompany drawings.

DETAILED DESCRIPTION

In the following description, for purposes of explanation rather than limitation, specific details, such as the particular architecture, interfaces, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It should be expressly understood that the drawings are included for illustrative purposes and do not represent the scope of the present invention. In the accompanying drawings, like reference numbers in different drawings may designate similar elements.

Figure 1:
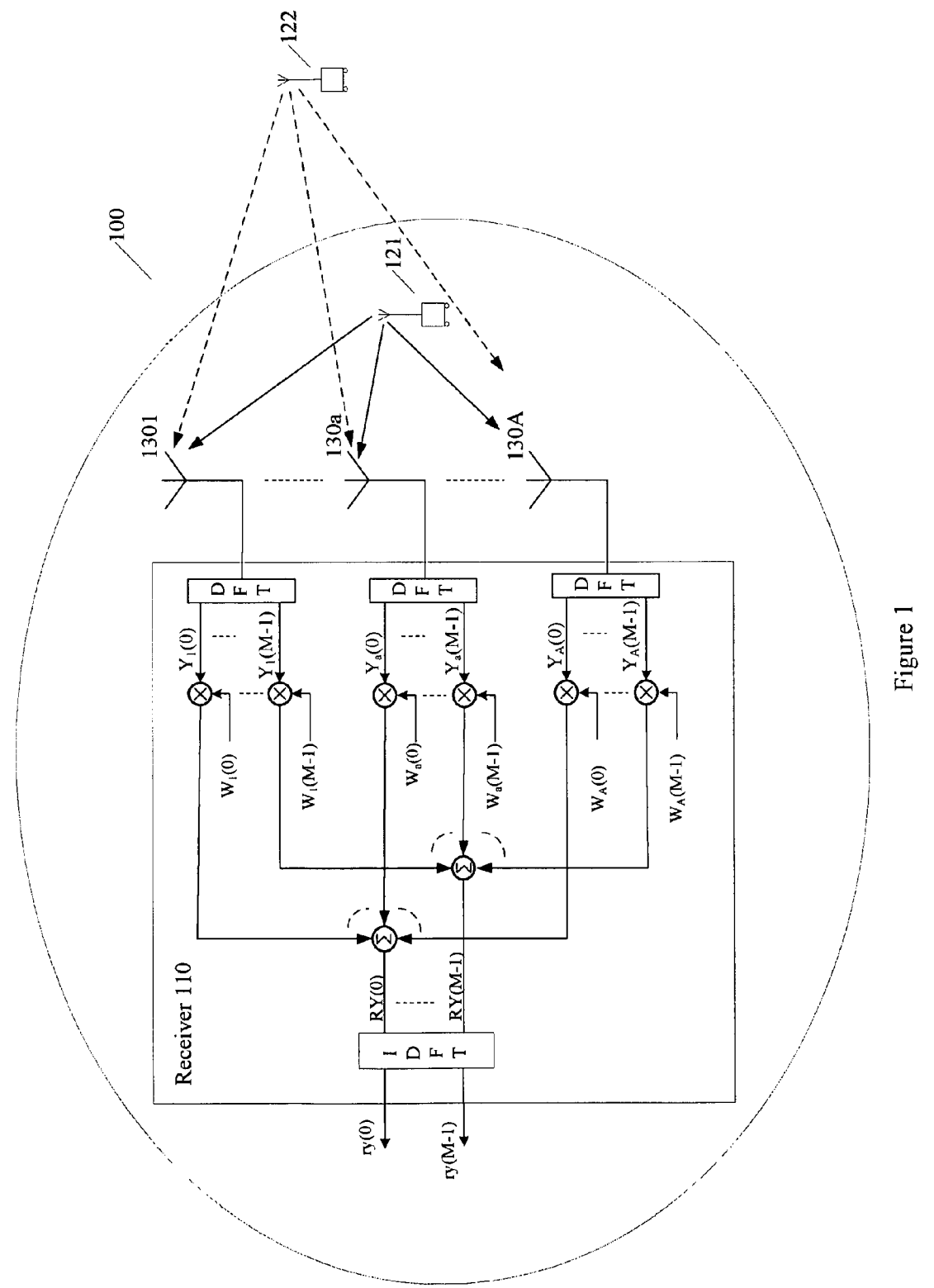
FIG. 1 schematically illustrates a wireless communication system in which the present invention advantageously can be applied.

FIG. 1 schematically shows a wireless communication system 100 in which the present invention advantageously can be applied. This wireless communication system 100 may be a LTE system, e.g. a TD-LTE system, and comprise eNodeBs and User Equipments (UEs) in communication with each other. For the sake of clarity, only a receiver 110 in an eNodeB, and two UEs 121, 122 comprising respective transmitters are shown on FIG. 1, but it will be appreciated that there may be any number of receivers and UEs.

The receiver 110 is equipped with multiple antennas 1301-130A. Preferably, in a TD-LTE system, the receiver 110 is equipped with eight antennas. UE 121 is moving or located in the cell served by the eNodeB, while UE 122 is out of the served cell and moving in a neighboring cell. The receiver 110 receives uplink transmission on a number of sub-carriers from UE 121 via its antennas 1301-130A. Since UE 122 is communicating in the neighboring cell, its uplink transmission may also possibly be received by the receiver 110 and then constitute inter-cell interference to uplink transmission of UE 121.

An exemplary signal model of this wireless communication system 100 is illustrated as follows before explaining the process of the present invention.

Assuming $X_{j,a}(m)$ denotes a signal transmitted by transmitter of UE j on a sub-carrier m that is allocated to the transmitter, i.e. UE j to an antenna a 1301, ..., 130a, ..., 130A of the receiver 110 in frequency domain, and $H_{j,a}(m)$ denotes a channel impulse response in frequency domain on a channel from the UEj to the antenna a, then the received uplink signal on sub-carrier m at antenna a may be expressed as:

$$Y_a(m) = \sum_{j=1}^{J} H_{j,a}(m) \cdot X_{j,a}(m),$$ (equation 1)

$$m = 0, 1, ... M-1; a = 1, ... A$$

Where M is the number of sub-carriers allocated to UE j, A is the number of receiving antennas, J−1 is the number of simultaneous UEs. Noise is treated as the J-th UE, i.e. UE J, and then $H_{J,a}(m)$ is calculated as:

$$H_{J,a}(m) = \sqrt{N_{0,a}}$$ (equation 2)

where $N_{0,a}$ is the noise power on antenna a.

Since the signals transmitted by a UE on sub-carrier m have nothing to do with receiving antennas, they will be the same for all antennas, i.e. $X_{j,a}(m)=X_j(m)$, $j=1, \ldots J-1$. The correlation of the transmitted signals from UEs, including UE J, i.e. the noises, may be expressed as:

$$E[X_{i,a}(m) \cdot X_{j,b}(m-n)^*] = \begin{cases} 0, & i \neq j \\ M \cdot \delta(n), & i = j \text{ but } i, j \neq J \\ 0, & i = j = J \text{ and } a \neq b \\ M \cdot \delta(n), & i = j = J \text{ and } a = b \end{cases} \quad \text{(equation 3)}$$

Equation 3 shows:
signals transmitted by two different UEs are uncorrelated;
a signal transmitted by a UE is fully correlated with itself except UE J, i.e. the noise;
the signals transmitted from UE J to different antennas, i.e. the noises at different antennas, are uncorrelated; and
the signals transmitted from UE J to one antenna, i.e. the noises at one antenna, are fully correlated.

Among the J−1 simultaneous UEs that transmit on sub-carrier m, only a UE located in the served cell, for example, UE 121 in FIG. 1, is the desired UE, that is, the signals transmitted by this UE are desired for the receiving antennas, while all the others served by other cells are interfering UEs.

In order to suppress noise and interferences, including inter-cell interferences, space-frequency domain equalization is needed in the receiver 110.

As shown in FIG. 1, in the receiver 110, an equalization weighting factor W is applied in frequency domain for each of signals received on sub-carriers at antennas 1301-130A. The multiple weighted signals for one sub-carrier are summed to recover the signal transmitted on the sub-carrier by the desired UE, for example UE k. The recovered signal after equalization on sub-carrier m for UE k in the frequency domain may be expressed as:

$$RY_k(m) = \sum_{a=1}^{A} W_{k,a}(m) \cdot Y_a(m) = (W_k(m))^T Y(m) \quad \text{(equation 4)}$$

where $W_{k,a}(m)$ denotes an equalization weighting factor at antenna a for sub-carrier m on which UE k transmits its signal.

The recovered signal is then transformed to time domain by for example IDFT (Inverse Discrete Fourier Transformation), that is, $$ry_k(m) = IDFT(RY_k(m)) \quad \text{(equation 5)}.$$

From the above, it could be seen that the quality of the recovered signals depends on the equalization weighting factors to a large extent. An equalization weighting vector formed by equalization weighting factors for sub-carrier m may be calculated for the desired UE k as follows:

$$W_k(m) = [W_{k,1}(m) \cdots W_{k,a}(m) \cdots W_{k,A}(m)]^T \quad \text{(equation 5)}$$

$$= \frac{1}{1 + (H_k(m))^H (R_k(m))^{-1} H_k(m)} \cdot ((R_k(m))^{-1} H_k(m))^*$$

$$= \frac{1}{1 + SINR_k(m)} \cdot ((R_k(m))^{-1} H_k(m))^*$$

In equation 5, $R_k(m)$ is an impairment covariance matrix for the desired UE k on sub-carrier m and is with a dimension of A-by-A. $R_k(m)$ may be calculated as follows:

$$R_k(m) = \left( \sum_{j=1}^{J-1} H_j(m)(H_j(m))^H + R_{n\&I}(m) \right) - H_k(m)(H_k(m))^H \quad \text{(equation 6)}$$

where $R_{n\&I}(m)$ is the correlation function of the noise and interference.

$SINR_k(m)$ is the Signal-to-Interference-and-Noise-Ratio for the desired UE k on sub-carrier m and may be calculated as:

$$SINR_k(m) = (H_k(m))^H (R_k(m))^{-1} H_k(m) \quad \text{(equation 7)}$$

Since the equalization weighting vector is calculated based on impairment covariance estimates, the performance of equalization will further depend on the accuracy of impairment covariance estimation.

In the state-of-art algorithm, the raw impairment covariance estimates is linearly averaged over a set of sub-carriers, say 12 sub-carriers in one resource block, to improve estimation accuracy. But this algorithm does not work well in case the number of involved receiving antennas becomes large.

Figure 2:
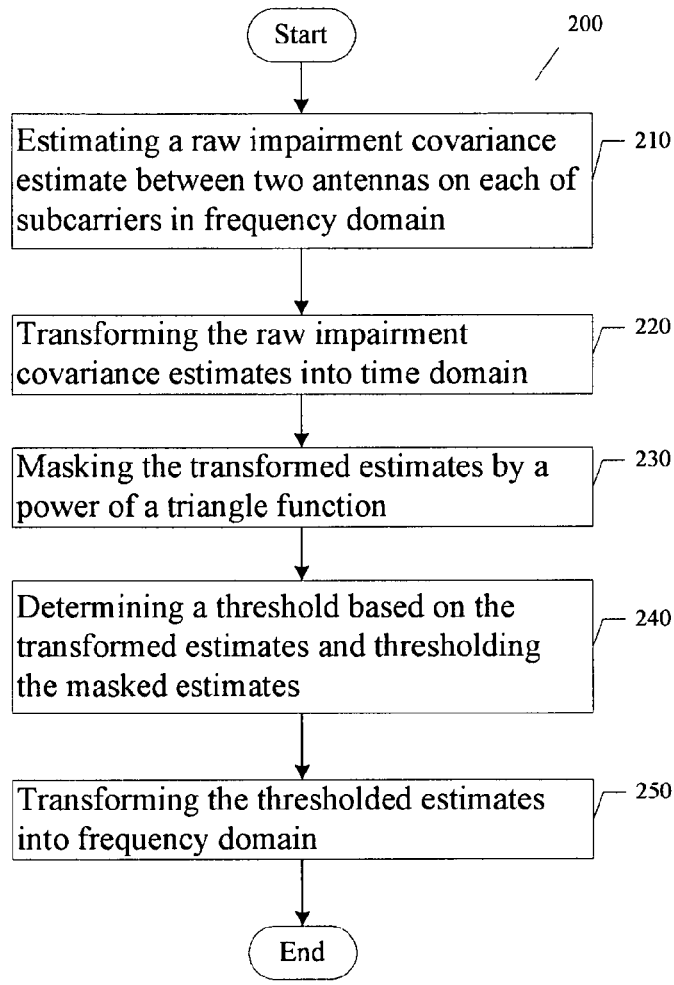
FIG. 2 illustrates a process for estimating impairment covariance according to an embodiment of the present invention.

FIG. 2 shows a flow chart of a process 200 for generating impairment covariance estimates according to an embodiment of the present invention.

In step 210, a raw impairment covariance estimate $R_{a,b}(m)$ between two antennas a, b on a sub-carrier m that is allocated to a transmitter in the studied cell is calculated, which counts both noise and interference generated from other transmitters in neighboring cells. A raw impairment covariance estimate may refer to a impairment covariance estimate generated using any of the state-of-art algorithms for impairment covariance estimation Preferably, this calculation may be performed using known algorithms in prior art, for example, the raw impairment covariance estimate may be estimated as:

$$R_{a,b}(m) = \frac{1}{M} \cdot \left( \frac{1}{L} \cdot \sum_{l=1}^{L} N_a(m,l) \cdot (N_b(m,l)^*) \right) \quad \text{(equation 8)}$$

Where $$N_a(m,l) = Y_a(m,l) - H'_{k,a}(m) \cdot X_k(m,l)$$

$$N_b(m,l) = Y_b(m,l) - H'_{k,b}(m) \cdot X_k(m,l) \quad \text{(equation 9)}$$

Here $Y_a(m,l)$ is the received signal on sub-carrier m at l-th pilot OFDM symbol on antenna a, $H'_{k,a}(m)$ is the channel estimate of the desired UE k on sub-carrier m at antenna a, and $X_k(m,l)$ is the transmitted signal in frequency domain of the desired UE k on sub-carrier m at l-th pilot OFDM symbol. And there are totally L pilot OFDM symbols involved in this estimation.

In step 220, the raw impairment covariance estimates are transformed into time domain through e.g. IDFT for further processing.

$$\rho_{a,b}(n) = IDFT[R_{a,b}(m)] \, n=0,1, \ldots M-1 \quad \text{(equation 10)}$$

where, actually, $\rho_{a,b}(n)$ is a period correlation function of impairments represented in time domain on antenna a and b, and is a sequence of data in time domain, here n is the index of data.

The transformed impairment covariance estimates are then processed in following procedures by masking and thresholding to improve estimation accuracy.

In step 230, the transformed impairment covariance estimates are masked by a triangle window with a width defined by the maximum delay spread. This triangle window will filter out the middle portion of the data sequence obtained by e.g. IDFT transformation, which portion mainly corresponds to noises.

According to an embodiment, the triangle window is defined by a power of a triangle function. Masking by a power of a triangle function is motivated by the fact that the correlation of two rectangle functions in time domain has a triangle shape, and then masking by a triangle function will reduce the impact of noise.

According to an embodiment, the masking function may be established as follows:

$$\hat{\rho}_{a,b}(n) = \begin{cases} \left(\frac{-n}{\lceil \tau_P \rceil} + 1\right)^q \cdot \rho_{a,b}(n), & n = 0, \ldots, \lceil \tau_P \rceil \\ 0, & n = \lceil \tau_P \rceil + 1, \ldots, M - (\lceil \tau_P \rceil + 1) \\ \left(\frac{n-M}{\lceil \tau_P \rceil} + 1\right)^q \cdot \rho_{a,b}(n), & n = M - \lceil \tau_P \rceil, \ldots, M - 1 \end{cases}$$ (equation 11)

where $\tau_P$ is the maximum delay spread, preferably, it is the maximum delay spread of the channel between the receiver and the transmitter, i.e. between the receiver and UE k. In context of present invention, $\tau_P$ could be set as the length of cyclic-prefix down-scaled from the FFT size to the DFT size of the desired UE. q is the exponent of the triangle function, which may be a positive value larger than 1, for example 16. Preferably, q is channel model-based parameter, and it may be decreased as the number of paths in the channel model increases.

In step 240, a threshold is determined based on transformed impairment covariance estimates and is applied to threshold the masked impairment covariance. The thresholding is to further reduce noises inside the triangle window.

According to an embodiment, in order to determine the threshold, absolute values of $\rho_{a,b}(n)$ are obtained:

$$\rho_{abs\ a,b}(n) = |\rho_{a,b}(n)|, n=0, \ldots, M-1$$ (equation 12)

Since after IDFT, the middle portion of the data sequence may be pure noises, the threshold is then determined based on a maximum absolute value of the transformed impairment covariance estimates in this portion, i.e. an interval determined by the maximum delay spread, for example, the threshold $\rho_{T\ a,b}$ may be set as follows:

$$\rho_{T\ a,b} = (1+\epsilon) \cdot \max(|\rho_{a,b}(n)|), n=\lceil \tau_P \rceil+1, \ldots, M-(\lceil \tau_P \rceil+1)$$ (equation 13).

Preferably, the threshold $\rho_{T\ a,b}$ set in equation 13 may be further defined as follows:

$$pwr_{a,b} = \text{var}(\rho_{a,b}(n)), n=\lceil \tau_P \rceil+1, \ldots, M-(+1), \text{ and}$$

$$\text{if } \frac{\max_{a=1,\ldots,A} |\rho_{a,a}(0)|^2}{\frac{1}{A}\sum_{a=1}^{A} pwr_{a,a}} < 1.1 \cdot M,$$

then the threshold $\rho_{T\ a,b}$ is set as zero.

Where $\epsilon$ is a positive value, for example 2. Preferably, $\epsilon$ may be a noise or channel model-based parameter.

The determination of the threshold may be performed before, in parallel to, or after the masking step.

Preferably, the determined threshold is applied to the masked impairment covariance estimates as follows:

$$\hat{\hat{\rho}}_{a,b}(n) = \hat{\rho}_{a,b}(n) \cdot \frac{\text{sign}(|\hat{\rho}_{a,b}(n)| - \rho_{T_{a,b}}) + 1}{2}$$ (equation 14)

where sign(x)=1 if x>=0, otherwise sign(x)=-1.

By applying the threshold, the noise impact on the correlation function is suppressed, and estimation accuracy in the noise dominant scenario is improved.

In step 250, the thresholded impairment covariance estimates are transformed back to frequency domain by e.g. a DFT:

$$R_{a,b}(m) = \text{DFT}(\hat{\hat{\rho}}_{a,b}(n))$$

The resultant impairment covariance estimate $R_{a,b}(m)$ constitutes the estimate of an element on a-th row and b-th column of impairment covariance matrix $R_k(m)$, which impairment covariance matrix is then used to calculate a equalization weighting vector for performing equalization in the receiver 110. As will be appreciated, although the embodiments of the present invention are described in the context of LTE system, preferably, the present invention is applicable to any wireless communication system where communications between transmitters and receivers with multiple antennas are conducted, and this process may be implemented in a radio base station like eNodeB, or a mobile terminal like UE.

Figure 3:
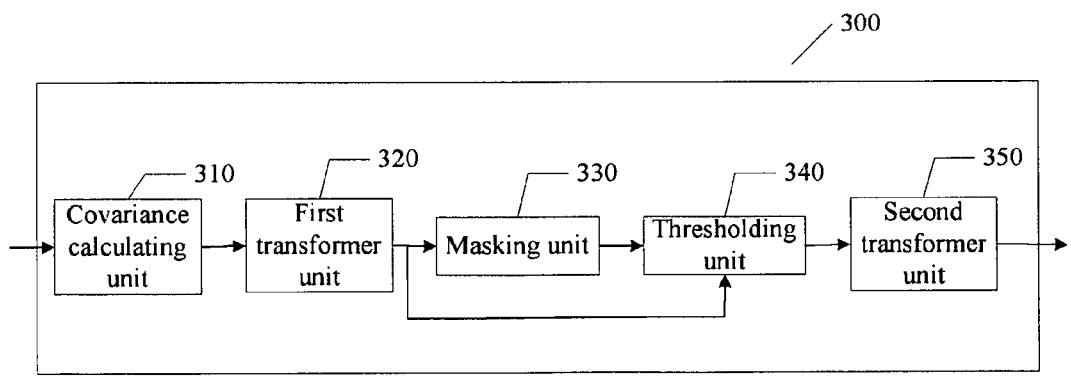
FIG. 3 illustrates a block diagram of a covariance estimator according to an embodiment of the present invention.

FIG. 3 shows a block diagram of a covariance estimator 300 according to an embodiment of the present invention. Said covariance estimator 300 is comprised in a receiver. The receiver may be e.g. an IRC receiver in a radio base station in a wireless communication system, like an eNodeB in a LTE-system. Alternatively, the receiver may be implemented in a UE. The receiver is equipped with multiple antennas and is receiving from transmitters in the wireless communication system.

The covariance estimator 300 generates impairment covariance estimates and provides an impairment covariance matrix formed by the impairment covariance estimates to calculate an equalization weighting vector for performing equalization.

In the covariance estimator 300, a raw covariance calculating unit 310 is included to calculate a raw impairment covariance estimate between two antennas on a sub-carrier in frequency domain. The calculation is done for each of the sub-carriers allocated to a desired transmitter, that is, a transmitter served by the studied cell. A first transformer unit 320 may receive and transform the raw impairment covariance estimates into time domain by using e.g. IDFT. The transformed impairment covariance estimates are then inputted into a masking unit 330, which masks the transformed impairment covariance estimate by a triangle window with a width defined by the maximum delay spread, preferably a power of a triangle function. A thresholding unit 340 will determine a threshold based on the transformed impairment covariance estimates from the first transformer unit 320. In one embodiment, the threshold may be determined as the largest absolute value of the transformed impairment covariance estimates. Then, the threshold is applied to threshold or select the masked impairment covariance estimates. Only the impairment covariance estimates of which the absolution values are above the threshold are kept. The thresholded impairment covariance estimates are passed to a second transformer unit 350 to be transformed into frequency domain. The resultant impairment covariance estimates after the transformation are used to form an impairment covariance matrix for subsequent space-frequency domain equalization.

Figure 4:
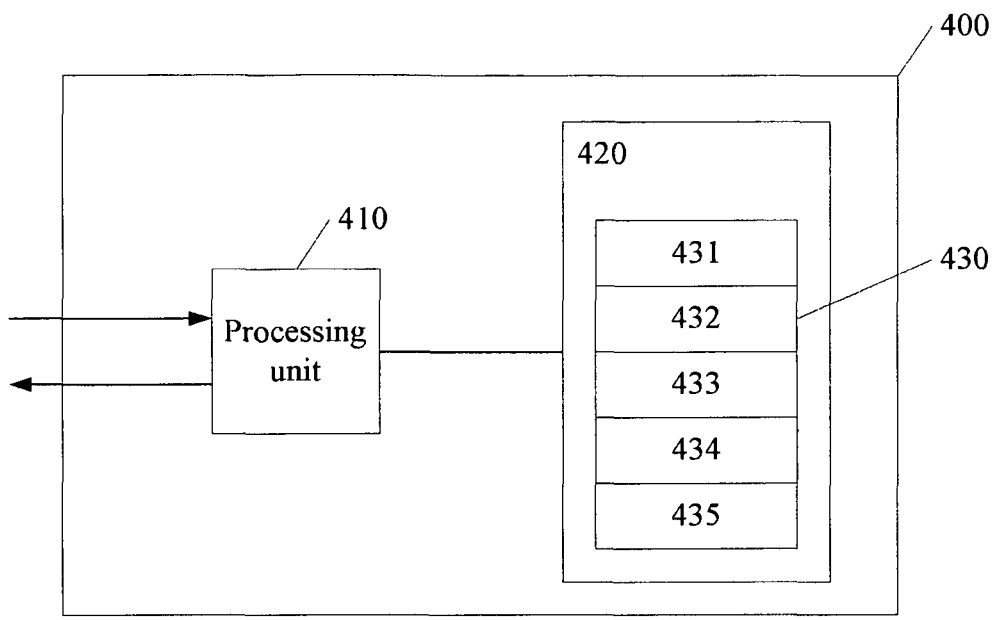
FIG. 4 illustrates a block diagram of a covariance estimator according to another embodiment of the present invention.

FIG. 4 schematically shows a block diagram of a covariance estimator 400 according to another embodiment of the present invention, which may be an alternative implementation of the covariance estimator 300 illustrated in FIG. 3.

Comprised in the covariance estimator 400 is here a processing unit 410 e.g. with a DSP (Digital Signal Processor). The processing unit 410 can be a single unit or a plurality of units to perform different steps of procedures described in process 200 described earlier in conjunction with FIG. 2.

Furthermore the covariance estimator 400 comprises at least one computer program product 420 in the form of a non-volatile memory, e.g. an EEPROM, a flash memory and a disk drive. The computer program product 420 comprises a computer program 430, which comprises code means which when run on the processing unit 410 causes the covariance estimator 400 to perform the steps of the process 200.

Hence in the exemplary embodiments described, the code means in the computer program 430 comprises a raw covariance calculating module 431 for performing step 210 of process 200; a first transformer module 432 for performing step 220 of process 200; a masking module 433 for performing step 230 of process 200; a thresholding module 434 for performing step 240 of process 200; and a second transformer module 435 for performing step 250 of process 200. That is, the modules 431-435 essentially perform the steps of process 200 to emulate the device described in FIG. 3. In other words, when the different modules 431-435 are run on the processing unit 410, they may correspond to the corresponding units 310, 320, 330, 340 and 350 of FIG. 3.

Figure 5:
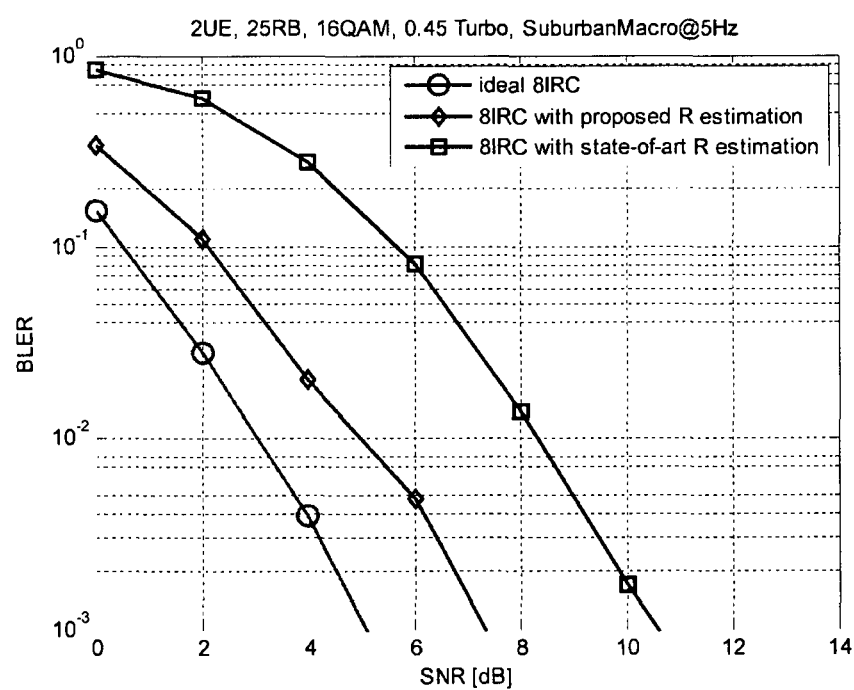
FIG. 5 illustrates a diagram of performance comparison between the impairment covariance estimation according to the present invention and the state-of-art impairment covariance estimation.

FIG. 5 illustrates performance comparison between impairment covariance estimation according to the present invention and the state-of-art algorithm that averages the estimated raw covariances over 12 sub-carriers in one resource block, For the sake of simplicity, two UEs are simulated, one is a UE served by the studied cell and the other is an interfering UE served by a neighboring cell. These two UEs have the same average signal strength and interfere with each other in their respective uplink transmission. The detailed simulation condition is shown in table 1.

TABLE 1 simulation parameter configurations

| Simulation parameter | Value |
| --- | --- |
| Standard | 3GPP LTE Release 8 |
| Physical channel | PUSCH |
| System bandwidth [MHz] | 20 |
| Channel propagation model | SCM-E Suburban Macro |
| Doppler frequency [Hz] | 5 |
| Number of occupied resource blocks by PUSCH | 25 |
| Modulation | 16QAM |
| Transport block size | 6456 (coding rate is roughly 0.45) |
| Antennas at the eNodeB | cross-polarized 8 antennas 0.7 wavelength antenna separation 90 degree antenna HPBW |

TABLE 1-continued simulation parameter configurations

| Simulation parameter | Value |
| --- | --- |
| Receiver type | IRC |
| Average DoA observed at eNodeB of the studied cell [degree] | 30 for the desired UE −30 for the interfering UE |
| Channel estimation algorithm | DFT based with adaptive virtual over-sampling[4] |

DFT based channel estimation with adaptive virtual over-sampling is adopted in a practical IRC receiver, the virtual over-sampling rate is 1 for SNR less than 10 dB.

As shown in FIG. 5, it can be concluded from the simulation results that by using the state-of-art impairment covariance estimation, the practical IRC receiver has a performance loss of about 5.5 dB comparing to an ideal IRC with perfect estimates. But with the impairment covariance estimation according to embodiments of the present invention, the performance loss is reduced to about 1.5-2 dB. That is to say, the impairment covariance estimation according to embodiments of the present invention has a performance improvement of about 4 dB in the simulated scenario comparing to the state-of-art impairment covariance estimation. The improvement is expected to be even larger if virtual over-sampling rate is higher than 1 in the channel estimation.

Although the present invention has been disclosed in the form of preferred embodiments and variations thereon, it will be understood that the above-mentioned embodiments illustrate rather than limit the present invention. As will be appreciated by one of skill in the art, the present invention may be embodied as a method, apparatus, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

ABBREVIATIONS

DFT Discrete Fourier Transform
IDFT Inverse Discrete Fourier Transform
SC-FDMA Single Carrier Frequency Division Multiple Access
MMSE Minimum Mean Square Error
IRC Interference Rejection Combining
PUSCH Physical Uplink Shared Channel
SCM-E Evolved Spatial channel model
QAM Quadrature Amplitude Modulation
HPBW Half power beam width
DoA Direction of arrival

The invention claimed is:

1. A method of generating impairment covariance estimates for equalization in a receiver of a wireless communication system, wherein the receiver is equipped with multiple antennas, and wherein an impairment covariance matrix is used to calculate equalization weighting vector for signals transmitted by a transmitter, the method comprising:
    calculating a raw impairment covariance estimate between a first antenna and a second antenna of the multiple antennas, for each of a plurality of subcarriers allocated to the transmitter in frequency domain;
    transforming the raw impairment covariance estimates into time domain;
    masking the transformed impairment covariance estimates by a triangle window with a width defined by a maximum delay spread;
    determining a threshold, based on the transformed impairment covariance estimates, and thresholding the masked impairment covariance estimates with the determined threshold; and
    transforming the thresholded impairment covariance estimates into frequency domain to form the impairment covariance matrix.

2. The method of claim 1, wherein the threshold is determined based on a maximum absolute value of the transformed impairment covariance estimates in an interval determined by the maximum delay spread.

3. The method of claim 2, wherein the threshold $\rho_{T_{a,b}}$ is set as follows:

$$\rho_{T_{a,b}} = (1+\epsilon) \cdot \max(|\rho_{A,B}(n)|), n = \lceil \tau_P \rceil + 1, \ldots, M - (\lceil \tau_P \rceil + 1), \text{ and}$$

$$\mathrm{pwr}_{a,b} = \mathrm{var}(\rho_{a,b}(n)), n = \lceil \tau_P \rceil + 1, \ldots, M - (\lceil \tau_P \rceil + 1),$$

if $$\frac{\max\limits_{a=1,\ldots,A} |\rho_{a,a}(0)|^2}{\frac{1}{A} \sum\limits_{a=1}^{A} \mathrm{pwr}_{a,a}} > 1.1 \cdot M,$$

then the threshold $\rho_{T_{a,b}}$ is set as zero,
    wherein $\tau_P$ is the maximum delay spread of the channel between the transmitter and the receiver, $\rho_{a,b}(n)$ are the transformed impairment covariance estimates between the first antenna a and the second antenna b, M is the number of subcarriers and A is the number of antennas.

4. The method of claim 2, wherein said thresholding is performed as follows to generate the thresholded impairment covariance estimate $\hat{\rho}_{a,b}(n)$:

$$\hat{\rho}_{a,b}(n) = \hat{\rho}_{a,b}(n) \cdot \frac{\mathrm{sign}(|\hat{\rho}_{a,b}(n)| - \rho_{T_{a,b}}) + 1}{2},$$

$$n = 0, \ldots, M-1,$$

wherein $\hat{\rho}_{a,b}(n)$ are the masked impairment covariance estimates between the first antenna a and the second antenna b, and $\rho_{T_{a,b}}$ is the determined threshold.

5. The method of claim 1, wherein transforming into time domain is performed by Discrete Fourier Transformation, and the triangle window is defined by a power of a triangle function.

6. The method of claim 5, wherein the step of masking is performed as follows to generate the masked impairment covariance $\hat{\rho}_{a,b}(n)$:

$$\hat{\rho}_{a,b}(n) = \begin{cases} \left(\frac{-n}{\lceil \tau_P \rceil} + 1\right)^q \cdot \rho_{a,b}(n), & n = 0, \ldots, \lceil \tau_P \rceil \\ 0, & n = \lceil \tau_P \rceil + 1, \ldots, M - (\lceil \tau_P \rceil + 1) \\ \left(\frac{n-M}{\lceil \tau_P \rceil} + 1\right)^q \cdot \rho_{a,b}(n), & n = M - \lceil \tau_P \rceil, \ldots, M-1, \end{cases}$$

wherein $\rho_{a,b}(n)$ are the transformed impairment covariance estimates between the first antenna a and the second antenna b, $\tau_P$ is the maximum delay spread of the channel between the transmitter and the receiver, and M is the number of subcarriers.

7. The method of claim 1, wherein the wireless communication system is a Long Term Evolution system and the receiver is an Interference-Rejection-Combing receiver.

8. The method of claim 1, wherein the wireless communication system is a Time-Division Duplexing Long Term Evolution system and the number of antennas is eight.

9. A covariance estimator for generating impairment covariances for equalization in a receiver of a wireless communication system, wherein the receiver is equipped with multiple antennas, and wherein an impairment covariance matrix is used to calculate an equalization weighting vector for signals transmitted by a transmitter, the covariance estimator comprising:
    a covariance calculating unit configured to calculate a raw impairment covariance estimate between a first antenna and a second antenna of the multiple antennas for each of a plurality of subcarriers allocated to the transmitter in frequency domain;
    a first transformer unit configured to transform the raw impairment covariance estimates into time domain;
    a masking unit configured to mask the transformed impairment covariance estimates by a triangle window with a width defined by a maximum delay spread;
    a thresholding unit configured to determine a threshold based on the transformed impairment covariance estimates and to threshold the masked impairment covariance estimates with the determined threshold; and
    a second transformer unit configured to transform the thresholded impairment covariance estimates into frequency domain to form the impairment covariance matrix.

10. The covariance estimator of claim 9, wherein the thresholding unit is configured to determine the threshold based on a maximum absolute value of the transformed impairment covariance estimates in an interval determined by the maximum delay spread.

11. The covariance estimator of claim 10, wherein the thresholding unit is configured to set the threshold $\rho_{T_{a,b}}$ as follows:

$$\rho_{T_{a,b}} = (1+\epsilon) \cdot \max(|\rho_{a,b}(n)|), n = \lceil \tau_P \rceil + 1, \ldots, M-(\lceil \tau_P \rceil + 1), \text{ and}$$

$$\text{pwr}_{a,b} = \text{var}(\rho_{a,b}(n)), n = \lceil \tau_P \rceil + 1, \ldots, M-(\lceil \tau_P \rceil + 1),$$

if $$\frac{\max\limits_{a=1,\ldots,A} |\rho_{a,a}(0)|^2}{\frac{1}{A}\sum\limits_{a=1}^{A} \text{pwr}_{a,a}} > 1.1 \cdot M,$$

then the threshold $\rho_{T_{a,b}}$ is set as zero,
wherein $\tau_P$ is the maximum delay spread of the channel between the transmitter and the receiver, $\rho_{a,b}(n)$ are the transformed impairment covariance estimates between the first antenna a and the second antenna b, M is the number of subcarriers, and A is the number of antennas.

12. The covariance estimator of claim 9, wherein the thresholding unit is configured to perform thresholding as follows to generate the thresholded impairment covariance estimate $\hat{\tilde{\rho}}_{a,b}(n)$:

$$\hat{\tilde{\rho}}_{a,b}(n) = \hat{\rho}_{a,b}(n) \cdot \frac{\text{sign}(|\hat{\rho}_{a,b}(n)| - \rho_{T_{a,b}}) + 1}{2},$$

$$n = 0, \ldots, M-1,$$

wherein $\hat{\rho}_{a,b}(n)$ are the masked impairment covariance estimates between the first antenna a and the second antenna b, and $\rho_{T_{a,b}}$ is the determined threshold.

13. The covariance estimator of claim 9, wherein the first transformer unit is configured to transform by Discrete Fourier Transformation, and the triangle window is defined by a power of a triangle function.

14. The covariance estimator of claim 13, wherein the masking unit is configured to perform masking as follows to generate the masked impairment covariance $\hat{\rho}_{a,b}(n)$:

$$\hat{\rho}_{a,b}(n) = \begin{cases} \left(\frac{-n}{\lceil \tau_P \rceil} + 1\right)^q \cdot \rho_{a,b}(n), & n = 0, \ldots, \lceil \tau_P \rceil \\ 0, & n = \lceil \tau_P \rceil + 1, \ldots, M - (\lceil \tau_P \rceil + 1) \\ \left(\frac{n-M}{\lceil \tau_P \rceil} + 1\right)^q \cdot \rho_{a,b}(n), & n = M - \lceil \tau_P \rceil, \ldots, M-1, \end{cases}$$

wherein $\rho_{a,b}(n)$ are the transformed impairment covariance estimates between the first antenna a and the second antenna b, $\tau_P$ is the maximum delay spread of the channel between the transmitter and the receiver, and M is the number of subcarriers.

15. The covariance estimator of claim 9, wherein the wireless communication system is a Long Term Evolution system and the receiver is an Interference-Rejection-Combing receiver.

16. The covariance estimator of claim 9, wherein the wireless communication system is a Time-Division Duplexing Long Term Evolution system and the number of antennas is eight.

17. A receiver comprising the covariance estimator of claim 9.

18. The receiver of claim 17, wherein the wireless communication system is a Long Term Evolution system and the receiver is an Interference-Rejection-Combing receiver.

* * * * *

UNITED STATES PATENT AND TRADEMARK OFFICE
CERTIFICATE OF CORRECTION

PATENT NO. : 8,848,778 B2
APPLICATION NO. : 13/990455
DATED : September 30, 2014
INVENTOR(S) : Guo et al.

Page 1 of 1

It is certified that error appears in the above-identified patent and that said Letters Patent is hereby corrected as shown below:

Specification

In Column 5, Line 12, in "(equation 3)", delete "i - j = J" and insert -- i = j = J --, therefor.

In Column 6, Line 43, in "(equation 8)", delete " $R_{a,b}(m) = \frac{1}{M} \cdot \left( \frac{1}{L} \cdot \sum_{l=1}^{L} N_a(m, l) \cdot (N_b(m, l)^*) \right.$ " and insert -- $R_{a,b}(m) = \frac{1}{M} \cdot \left( \frac{1}{L} \cdot \sum_{l=1}^{L} N_a(m, l) \cdot (N_b(m, l)^* \right)$ --, therefor.

In Column 7, Line 59, delete ", $M-(+1)$," and insert --, $M - (\lceil \tau_p \rceil + 1)$, --, therefor.

In Column 9, Line 44, delete "block," and insert -- block. --, therefor.

Claims

In Column 11, Lines 49-50, in Claim 3, delete " $\rho_{T\,a,b} = (1+\epsilon) \cdot \max(|\rho_{A,B}(n)|), n = \lceil \tau_P \rceil + 1, \ldots, M - (\lceil \tau_P \rceil + 1),$ and " and insert -- $\rho_{T\,a,b} = (1+\varepsilon) \cdot \max(|\rho_{a,b}(n)|), \quad n = \lceil \tau_P \rceil + 1, \ldots, M - (\lceil \tau_P \rceil + 1),$ and --, therefor.

Signed and Sealed this
Sixteenth Day of August, 2016

Michelle K. Lee
*Director of the United States Patent and Trademark Office*